US007042655B2

(12) United States Patent  (10) Patent No.: US 7,042,655 B2
Sun et al.  (45) Date of Patent: May 9, 2006

(54) APPARATUS AND METHOD FOR USE IN FULFILLING ILLUMINATION PRESCRIPTION

(75) Inventors: Yupin Sun, Yorba Linda, CA (US); Waqidi Falicoff, Newport Beach, CA (US); William A. Parkyn, Jr., Lomita, CA (US)

(73) Assignee: Light Prescriptions Innovators, LLC, Irvine, CA (US)

( * ) Notice: Subject to any disclaimer, the term of this patent is extended or adjusted under 35 U.S.C. 154(b) by 0 days.

(21) Appl. No.: 10/726,130

(22) Filed: Dec. 1, 2003

(65) Prior Publication Data

US 2004/0189933 A1   Sep. 30, 2004

Related U.S. Application Data

(60) Provisional application No. 60/319,747, filed on Dec. 2, 2002.

(51) Int. Cl.
  *G02B 13/18* (2006.01)
(52) U.S. Cl. ...................................... 359/708; 359/709
(58) Field of Classification Search ................ 359/708, 359/709
  See application file for complete search history.

(56) References Cited

U.S. PATENT DOCUMENTS

| 1,399,973 | A | 12/1921 | Limpert |
| 1,977,689 | A | 10/1934 | Muller |
| 2,254,961 | A | 9/1941 | Harris |
| 2,362,176 | A | 11/1944 | Swanson |
| 2,908,197 | A | 10/1959 | Wells et al. |
| 3,760,237 | A | 9/1973 | Jaffe |
| 3,774,021 | A | 11/1973 | Johnson |
| 3,938,177 | A | 2/1976 | Hansen et al. |
| 4,192,994 | A | 3/1980 | Kastner |
| 4,211,955 | A | 7/1980 | Ray |
| 4,337,759 | A | 7/1982 | Popovich et al. |
| 4,342,908 | A | 8/1982 | Henningsen et al. |
| 4,388,673 | A | 6/1983 | Maglica |
| 4,464,707 | A | 8/1984 | Forrest |

(Continued)

FOREIGN PATENT DOCUMENTS

EP   0 450 560 A2   10/1991

(Continued)

OTHER PUBLICATIONS

U.S. Appl. No. 10/269,479, filed Oct. 11, 2002, Benitaz.

(Continued)

*Primary Examiner*—Scott J. Sugarman
(74) *Attorney, Agent, or Firm*—Thomas F. Lebens; Sinsheimer, Schiebelhut & Baggett

(57) ABSTRACT

The present embodiments provide methods, apparatuses, and assemblies for use in producing a desired output beam that meets a desired intensity prescription. An apparatus can include an input surface, and an optically active output surface that receives a collimated beam, such that the output surface refractively maps an illuminance distribution of the collimated beam into a prescribed intensity pattern. The apparatus can include a collimating lens that collimates an input beam. Additionally, the output surface can be defined according to a cumulative illumination integral for the illuminance distribution and a cumulative illumination integral of the intensity pattern. Some embodiments provide methods that can determine an illumination integral for an illuminance pattern of an input, determine an intensity prescription, establish a spatio-angular correspondence of the input beam with the intensity prescription, derive surface normal vectors, and determine the output surface according to the surface normal vectors.

12 Claims, 13 Drawing Sheets

U.S. PATENT DOCUMENTS

| | | | |
|---|---|---|---|
| 4,638,343 A | 1/1987 | Althaus et al. | |
| 4,675,725 A | 6/1987 | Parkyn | |
| 4,698,730 A | 10/1987 | Sakai et al. | |
| 4,727,289 A | 2/1988 | Uchida | |
| 4,727,457 A | 2/1988 | Thillays | |
| 4,920,404 A | 4/1990 | Shrimali et al. | |
| 5,055,892 A | 10/1991 | Gardner et al. | |
| 5,140,220 A | 8/1992 | Hasegawa | |
| 5,302,778 A | 4/1994 | Maurinus | |
| 5,335,157 A | 8/1994 | Lyons | |
| 5,343,330 A | 8/1994 | Hoffman et al. | |
| 5,404,282 A | 4/1995 | Klinke et al. | |
| 5,404,869 A | 4/1995 | Parkyn et al. | |
| 5,438,453 A | 8/1995 | Kuga | |
| 5,452,190 A | 9/1995 | Priesemuth | |
| 5,528,474 A | 6/1996 | Roney et al. | |
| 5,557,471 A * | 9/1996 | Fernandez | 359/709 |
| 5,577,492 A | 11/1996 | Parkyn et al. | |
| 5,580,142 A | 12/1996 | Kurematsu et al. | |
| 5,608,290 A | 3/1997 | Hutchisson et al. | |
| 5,613,769 A | 3/1997 | Parkyn et al. | |
| 5,655,830 A | 8/1997 | Ruskouski | |
| 5,655,832 A | 8/1997 | Pelka et al. | |
| 5,676,453 A | 10/1997 | Parkyn, Jr. et al. | |
| 5,757,557 A | 5/1998 | Medvedev | |
| 5,777,433 A | 7/1998 | Lester et al. | |
| 5,806,955 A | 9/1998 | Parkyn, Jr. et al. | |
| 5,813,743 A | 9/1998 | Naka | |
| 5,865,529 A | 2/1999 | Yan | |
| 5,894,195 A | 4/1999 | McDermott | |
| 5,894,196 A | 4/1999 | McDermott | |
| 5,897,201 A | 4/1999 | Simon | |
| 5,898,267 A | 4/1999 | McDermott | |
| 5,898,809 A | 4/1999 | Taboada et al. | |
| 5,924,788 A | 7/1999 | Parkyn | |
| 5,926,320 A | 7/1999 | Parkyn et al. | |
| 5,966,250 A | 10/1999 | Shimizu | |
| 6,019,493 A | 2/2000 | Kuo et al. | |
| 6,030,099 A | 2/2000 | McDermott | |
| 6,044,196 A | 3/2000 | Winston et al. | |
| 6,048,083 A | 4/2000 | McDermott | |
| 6,139,166 A | 10/2000 | Marshall et al. | |
| 6,166,860 A | 12/2000 | Medvedev et al. | |
| 6,166,866 A | 12/2000 | Kimura et al. | |
| 6,177,761 B1 | 1/2001 | Pelka et al. | |
| 6,181,476 B1 | 1/2001 | Medvedev | |
| 6,201,229 B1 * | 3/2001 | Tawa et al. | 250/201.5 |
| 6,268,963 B1 | 7/2001 | Akiyama | |
| 6,273,596 B1 | 8/2001 | Parkyn | |
| 6,282,821 B1 | 9/2001 | Freier | |
| 6,301,064 B1 | 10/2001 | Araki et al. | |
| 6,350,041 B1 | 2/2002 | Tarsa et al. | |
| 6,361,190 B1 | 3/2002 | McDermott | |
| 6,450,661 B1 | 9/2002 | Okumura | |
| 6,473,554 B1 | 10/2002 | Pelka | |
| 6,483,976 B1 | 11/2002 | Shie et al. | |
| 6,488,392 B1 | 12/2002 | Lu | |
| 6,502,964 B1 | 1/2003 | Simon | |
| 6,504,301 B1 | 1/2003 | Lowery | |
| 6,536,923 B1 | 3/2003 | Merz | |
| 6,547,400 B1 | 4/2003 | Yokoyama | |
| 6,547,423 B1 | 4/2003 | Marshall et al. | |
| 6,560,038 B1 | 5/2003 | Parkyn et al. | |
| 6,578,989 B1 | 6/2003 | Osumi et al. | |
| 6,580,228 B1 | 6/2003 | Chen et al. | |
| 6,582,103 B1 | 6/2003 | Popovich et al. | |
| 6,598,998 B1 | 7/2003 | West et al. | |
| 6,603,243 B1 | 8/2003 | Parkyn et al. | |
| 6,607,286 B1 | 8/2003 | West et al. | |
| 6,616,287 B1 | 9/2003 | Sekita et al. | |
| 6,621,222 B1 | 9/2003 | Hong | |
| 6,637,924 B1 | 10/2003 | Pelka et al. | |
| 6,639,733 B1 | 10/2003 | Minano et al. | |
| 6,646,813 B1 | 11/2003 | Falicoff | |
| 6,647,199 B1 | 11/2003 | Pelka et al. | |
| 6,674,096 B1 | 1/2004 | Sommers | |
| 6,679,621 B1 | 1/2004 | West | |
| 6,688,758 B1 | 2/2004 | Thibault | |
| 6,786,625 B1 | 9/2004 | Wesson | |
| 6,796,698 B1 | 9/2004 | Sommers et al. | |
| 6,803,607 B1 | 10/2004 | Chan et al. | |
| 6,811,277 B1 | 11/2004 | Amano | |
| 2002/0034012 A1 | 3/2002 | Santoro et al. | |
| 2002/0080623 A1 | 6/2002 | Pashley | |
| 2003/0076034 A1 | 4/2003 | Marshall | |
| 2004/0070855 A1 | 4/2004 | Benitez | |
| 2004/0105171 A1 | 6/2004 | Minano | |
| 2004/0246606 A1 | 12/2004 | Benitez et al. | |
| 2005/0024744 A1 | 2/2005 | Falicoff | |
| 2005/0086032 A1 | 4/2005 | Benitez | |
| 2005/0117125 A1 | 6/2005 | Minano et al. | |
| 2005/0129358 A1 | 6/2005 | Minano et al. | |

FOREIGN PATENT DOCUMENTS

| | | |
|---|---|---|
| ES | 2142752 | 12/2000 |
| SU | 122051 A1 | 1/1987 |
| WO | WO 99/09349 | 2/1999 |
| WO | WO 99/13266 | 3/1999 |
| WO | WO 01/07828 A1 | 2/2001 |
| WO | WO 03/066374 A2 | 8/2003 |
| WO | WO 03/066374 A3 | 8/2003 |
| WO | WO 04/007241 A2 | 1/2004 |

OTHER PUBLICATIONS

U.S. Appl. No. 10/461,557, filed Jun. 2003, Minano.
U.S. Appl. No. 10/822,874, filed Jul. 18, 2003, Minano.
U.S. Appl. No. 10/772,088, filed Feb. 3, 2004, Minano, et al.
U.S. Appl. No. 10/779,259, filed Feb. 13, 2004, Benitaz.
Remillard, Everson and Weber, "Loss Mechanisms Optical Light Pipes" *Applied Optics* vol. 31 #343 pp. 7232-7241 Dec. 1992.
Parkyn et al The Black Hole™: Cuspated waveguide-injectors and illuminators for LEDs; Part of the SPIE Conference on Nonimaging Optics: Maximum Efficiency Light Transfer V, Denver, CO, Jul. 1999.
Hyper ARGUS®LED, Hyper-Bright, 3mm (T1) LED, Non Diffused; Mar. 1, 2000; Infineon Technologies, pp. 1-9.
Spigulis, "Compact dielectric reflective elements, Half-sphere concentrators of radially emitted light" *Applied Optics* vol. 33, No. 25, Sep. 1994.
U.S. Appl. No. 10/903,925, filed Jul. 29, 2004, Fallcoff.
U.S. Appl. No. 10/901,919, filed Jul. 28, 2004, Benitaz.
U.S. Appl. No. 10/851,471, filed May 21, 2004, Benitez, et al.
U.S. Appl. No. 10/880,386, filed Jun. 28, 2004, Benitez, et al.
Benitaz, P. "Chapter 6: The SMS design method in three dimensions", from *Conceptos avanzados de óptica anidólica: disefio y fabricación*, PhD dissertation, UPM, (1998).
Benitaz, P.; Mohedano, R.; Minano, J. "Design in 3D geometry with the Simultaneous Multiple surface design method of Nonimaging Optics" Instituto de Engergia Solar, E.T.S.I. Telecommunicacion, Universidad Politacnica, 28040. Madrid, Spain. (Jul. 1999).
International Search Report. PCT/US03/38240, Jul. 26, 2004.

U.S. Appl. No. 10/814,598, filed Mar. 30, 2004, Chaves, et al.

U.S. Appl. No. 10/816,228, filed Mar. 31, 2004, Chaves, et al.

International Search Report. PCT/US03/32076. Apr. 20, 2004.

International Search Report. PCT/US03/38024, Nov. 10, 2004.

International Search Report. PCT/US04/14938, Mar. 1, 2005.

* cited by examiner

APPARATUS AND METHOD FOR USE IN FULFILLING ILLUMINATION PRESCRIPTION

PRIORITY CLAIM

This application claims the benefit of U.S. Provisional Application No. 60/319,747 filed Dec. 2, 2002, incorporated herein by reference in its entirety.

FIELD OF THE INVENTION

The present invention relates generally to optical illumination lenses, and more particularly to lenses that receive a collimated beam and transform it into a desired illumination pattern.

BACKGROUND OF THE INVENTION

Many devices, such as lenses, can alter the paths of light, focus light, cause light to diverge and provide other similar control over light. However, achieving the desired resulting light beam can often require multiple lenses and complex structures.

Further, achieving a desired output beam can be difficult because of varying input or received light beams. As the input beams vary, the lens and/or lens assemblies often fail to provide the desired output beam.

Therefore, although some lenses and/or lens assemblies may provide some potential benefits, a number of significant impediments to their usage exist and are possibly serving to limit or deter further beneficial implementations.

SUMMARY OF THE INVENTION

The present embodiments advantageously addresses the needs above as well as other needs by providing apparatuses, assemblies and methods for use in generating an output beam having a desired intensity prescription. In some embodiments, an apparatus for use in generating the desired intensity prescription can include an input surface, and an optically active output surface that receives a collimated beam, wherein the output surface refractively maps an illuminance distribution of the collimated beam into a pre-scribed intensity pattern, and wherein the input and output surfaces at least in part define a volume of transparent dielectric. The output surface can include, in some embodiments, a plurality of sections with disconnects between at least two of the plurality of sections. The apparatus can additionally include a collimating lens that collimates an input beam to generate the collimated beam, wherein the input surface is positioned proximate the collimating lens to receive the collimated beam. Additionally, the output surface can further be defined according to a cumulative illumination integral for the illuminance distribution and a cumulative illumination integral of the intensity pattern.

Some embodiments provide methods for use in defining a lens profile. These methods determine an illumination integral for an illuminance pattern of an input beam, determine a far-field intensity prescription, establish a one to one spatio-angular correspondence of transverse location of the input beam with direction in the intensity prescription, derive surface normal vectors of an output surface of the transverse locations across the input beam, and determine the output surface according to the surface normal vectors. The methods can further determine a normalized cumulative illumination integral for the far-field intensity prescription, wherein the determination of the illumination integral further comprises determining a normalized illumination integral for the transverse illuminance pattern.

Additional embodiments provide methods for use in defining a lens profiles. These methods determine an intensity prescription, determine an illuminance pattern of an input beam, and define an optically active surface of a lens. The defining of the optically active surface can include integrating a cumulative flux distribution of the determined illuminance pattern, integrating a cumulative flux distribution of the determined intensity prescription and obtaining first and second factored profile angles, sweeping the first profile angle along a space defined by the second profile, and defining the optically active surface according to the sweep of the first profile angle. Some of these embodiments further modify the determined optically active surface at perimeters of the determined active surface. Further, some embodiments determine a subsequent intensity prescription according to the defined optically active surface, repeat the defining of the optically active surface of the lens, and determine a subsequent optically active surface according to the subsequent intensity prescription.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
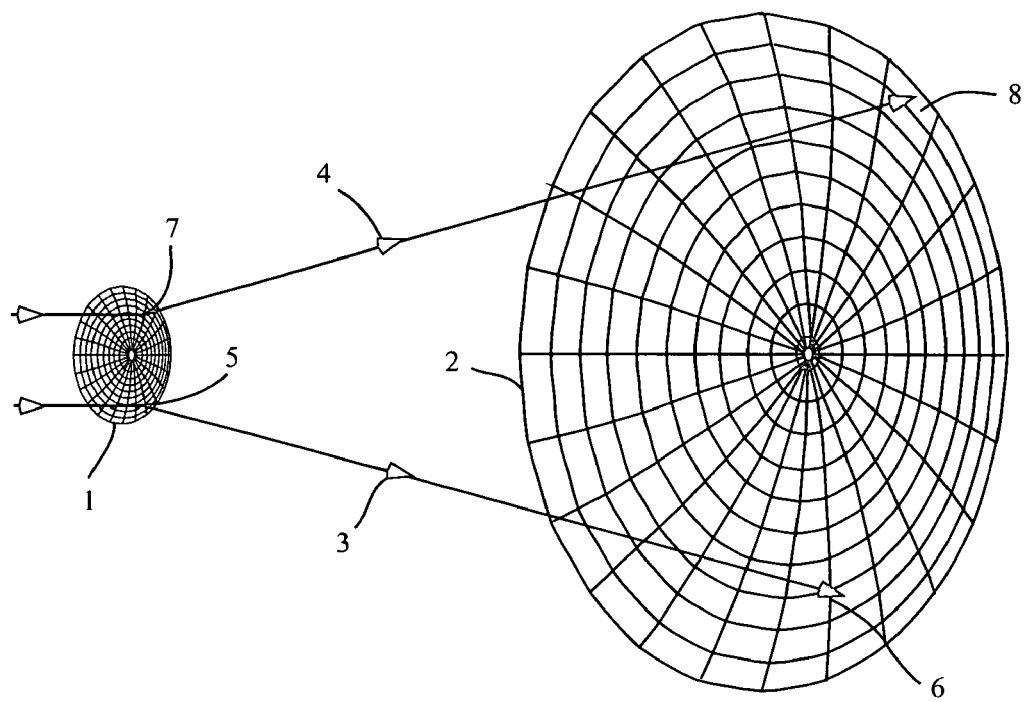
FIG. 1 depicts diverging lens and generally spherical screen representing the angle space of a far field to define the mathematical coordinates for describing the photometric performance of beam divergence.

Corresponding reference characters can indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

The present invention relates generally to optical illumination lenses. Some embodiments provide lenses that can receive a collimated beam and transform that beam into a desired illumination pattern, and some preferred embodiments provide lens assemblies specified by a prescription either for illuminance or far-field intensity. The present embodiments can provide a transformer lens that can receive a collimated beam of a known illumination profile and create an output beam fulfilling a given intensity prescription. The lens assemblies of the present embodiments have numerous applications, such as relating to automotive headlights, interior and/or exterior lighting and/or accent lighting and numerous other implementations.

The terms used herein of light and illumination are not restricted to the visible wavelength range of the science of photometry, 380 to 750 nanometers, but can additionally encompass the entire ultraviolet and infrared range of radiometry, those wavelengths generally amenable to geometric optics and pixilated image-detectors, approximately 100 to 10,000 nanometers. In these non-visible ranges, the present embodiments can have similar technological benefits to those it provides in the visible range, in providing better optimized illumination for imagers.

A defining notion of geometric optics is that of the ray, often defined by an infinitely narrow geometrical line of light propagation. The physical basis of a ray, however, is a narrow beam of light passing through an aperture or opening, in an opaque wall, thence crossing space to pass through another, slightly larger aperture. The slightly divergent tube of light connecting these two apertures is a photometric ray, providing illumination and conveying radiant energy in a specific direction. When the second aperture is not much larger than the first, the input light is called collimated, and the light within the ray is considered to have the same direction vector. When such a ray is refracted or reflected, theoretically all the light in its propagation path or tube remains parallel. Paraxial, or small-angle, optics can be applicable to the extent that light in an optical system can thus be generally characterized as an ordered collection of such rays. The smallest physical scale of such a ray-tube is limited by diffraction to, for example, hundreds of wavelengths in diameter, but this is only about a fraction of a millimeter for visible light, and thus indistinguishable from geometric lines by the naked eye.

In defining geometric optics, one the radiant energy can be theoretically ignored within a ray and deal with the ray's path in space, and the wavefront it adumbrates. Alternatively, the present embodiments are generally directed toward, defining and/or employing illumination optics that deal with the generation of illumination distributions through methods that utilize geometric optics but go beyond path and/or wavefronts by keeping track of ray-brightness. Illumination optics can be theoretically defined by assuming rays can be divided up into very small but finite rays, each carrying with it a small glowing image of a light source or a patch of the light source. For example referring to the two aligned apertures discussed above, illumination optics can be thought of as looking back through the second aperture at the first aperture and seeing a small bright spot that a telescope could magnify into an image of the source of the light. This light-emitting source has the scalar property of luminance, experienced as visible brightness. When divided by the square of a refractive index, luminance is an invariant that is carried along the ray unchanged, where the inverse square law is brought about by the shrinking of the small source-image that defines the ideal ray's very small divergence as distance from the source increases. For example, a preferred ray from some present lens-embodiments could, at a large distance from the lens, generally be considered as carrying with it an image of the distant lens, at least that portion of the distant lens that is lit up with an image of the luminous source.

Designing a luminaire to fulfill a given illumination prescription can be made more difficult in many instances due, for example, to conflicting motivations of minimizing device size yet maximizing device luminosity. Such factors as dimensional tolerances and source-variations can make it difficult to custom-design luminaries for non-trivial illumination prescriptions, yet make it far easier to produce a collimating luminaire, defined as one with substantially all rays from the center of the source exiting the luminaire in parallel. Accordingly, some present embodiments might rely on this fact to produce a separate illumination lens that receives a beam of collimated light of known cross-section and to transform this received bean into a beam fulfilling a given illumination prescription.

The utility of this division of labor lies in a collimated beam having overall characteristics that are relatively insensitive to device tolerances or source variations. The brightest rays are generally exiting the luminaire in parallel, with more divergent, dimmer rays co-exiting with them. The rays exiting a collimator can be characterized by their exit-plane illuminance distribution, one of several important input variables of the present embodiments, which can be characterized as a lens that transforms collimated illuminance into a desired output intensity distribution.

It has been determined, in relation to some of the present embodiments, that fulfilling a prescribed illumination pattern, normalized to an overall beam luminosity, can be accomplished by, at least in part, deflecting particular sectors or beamlets of the collimated beam into particular directions of the prescription in preferred ways such that the intensities of the beamlets add to a desired resultant value.

Some of the differences between illumination optics and geometric optics may be found from an examination of converging and diverging lenses, particularly well-corrected lenses with relatively good quality focusing. An isotropic source at the focal point of a lens results in a generally collimated beam. When a collimated beam encounters an ideal lens, a positive lens focuses the light to a point or caustic, after which the beam diverges with a particular intensity distribution. Alternatively, a negative lens creates a diverging beam that appears to come from a point, but has substantially the same intensity distribution as the distribution achieved from the converging lens of the same focal length and same collimated input. FIGS. 2–5 show examples of diverging and converging lenses 10 and 40, respectively, described fully below.

One of the significant factors of some of the present embodiments that attempt to redistribute collimated light is based on the non-uniform flux-transfer of ideal (perfectly imaging) lenses. When a collimated beam with constant illuminance (E) is converted into a diverging beam by either a converging or diverging imaging lens, the resulting beam typically does not have constant intensity (I), but instead one that is proportional to $\cos^3\theta$ and thus growing brighter with divergence angle $\theta$. When applied to illumination of a planar surface, the inverse of this effect is the source of the known $\cos^4\theta$ illumination falloff, such as the falloff of projector lenses.

Imaging lenses can be approximated at small angles by spheres, and larger divergence angles can be approximated by hyperboloids, with eccentricity determined by the refractive index of the lens. In contrast, non imaging lenses designed by and/or employed in some preferred embodiments have shapes that are numerically specified (for example, with computer controlled machining of injection molds). Each such shape can be evaluated according to the combination of a collimated input beam and the desired far-field intensity $I(\theta)$.

With lenses being circularly symmetric, the input beam can be defined in some embodiments by radial coordinate r, a distance of a point from the beam's center, with an outermost radius R defining the edge of a lens. A circular beam can further be characterized by illuminance $E[r]$, which is often a smoothly varying function, typically with a maximum illuminance value $E_0$ at the center and falling off monotonically with increasing r, but this is not a precondition of the present embodiments.

In generating lens profiles for some of the present embodiments, uniform illuminance for the collimated input light can be assumed to simplify mathematical calculations. Few actual collimators, however, exhibit this trait. Rather, collimator illuminance $E[r]$ is a function of radius r from the center to the limiting radius R, generally measured at some exit plane of the device. This radius r corresponds to the term "ray height" of imaging optics. Some preferred embodiments provide one or more illumination lenses that can be optically aligned with and/or installed with the collimated light source to produce a desired output beam with a desired intensity $I(\theta)$, through a range from an initial angle ($\theta_O$), typically at a center of the beam, out to a desired maximum angle ($\theta_{MAX}$).

In one series of preferred embodiments, each non-imaging lens can be designed to distribute a collimated beam into angle space by defining and/or assigning a unique far-field divergence or deflection angle $\theta[r_i]$ for each particular radius $r_i$ within the input beam, with outermost lens radius R assigned to outermost divergence angle $\delta$ of the output beam. This radius corresponds to the term "ray height" of imaging optics. The deflection angle $\theta[r_i]$ is produced by refraction according to an output-surface slope angle $\alpha$ of a lens, with the output surface defined by its sag $z[r]$ (i.e., deviation from a plane). The surface slope can be defined by $dz/dr=\tan(\alpha)$, so that integrating a slope-angle function $\alpha[r]$ gives the surface specification $z[r]$. As such, some embodiments establish a one to one spatio-angular correspondence of traverse locations of a collimated beam with a direction of an intensity prescription. An array of surface normal vectors can thus be generated for a plurality of traverse locations across the collimated beam, where the vector array can define a spatial orientation for an exit surface of a desired lens. The exit surface can be defined by integrating the vector array of normal vectors.

Further, the slope-angle function $\alpha[r]$ can in turn be calculated from the divergence function $\theta[r]$, which comes from the confluence of the collimator illuminance distribution $E[r]$ and the intensity prescription $I(\theta)$, via flux conservation. The collimated input flux $dF_1$, within an annular elemental lens area $dA=2\pi r dr$ is given by $dF_1=(2\pi E[r] dr)$. Given the lens efficiency $\eta$, the output flux can be defined by $dF_2=\eta dF_1$. The output flux can further be defined by $dF_2=(2\pi I[\theta]\sin(\theta)\, d\theta)$. When the deflection function $\theta[r]$ is monotonic the slope-angle function $\alpha[r]$ and the lens-height function $z[r]$ are also typically monotonic, such that both the slope-angle function and the lens-height function monotonically increase for a concave lens and decreasing for a convex one, with $dz/dr=\tan(\alpha)$. One of the more pertinent mathematical tool for utilizing this flux conservation is the normalized cumulative or encircled illumination flux functions $C_E[r]$ and output intensity flux function $C_I(\theta)$ for the output, defined respectively by:

$$C_E[r] = \frac{\int_0^r E[x]x\,dx}{\int_0^R E[x]x\,dx} \text{ with } C_E[R] = 1; \text{ and}$$

$$C_I[\theta] = \frac{\int_0^\theta I[\varphi]\sin\varphi\,d\varphi}{\int_0^{\theta_{MAX}} I[\varphi]\sin\varphi\,d\varphi} \text{ with } C_I[\theta_{MAX}] = 1.$$

Figure 9:
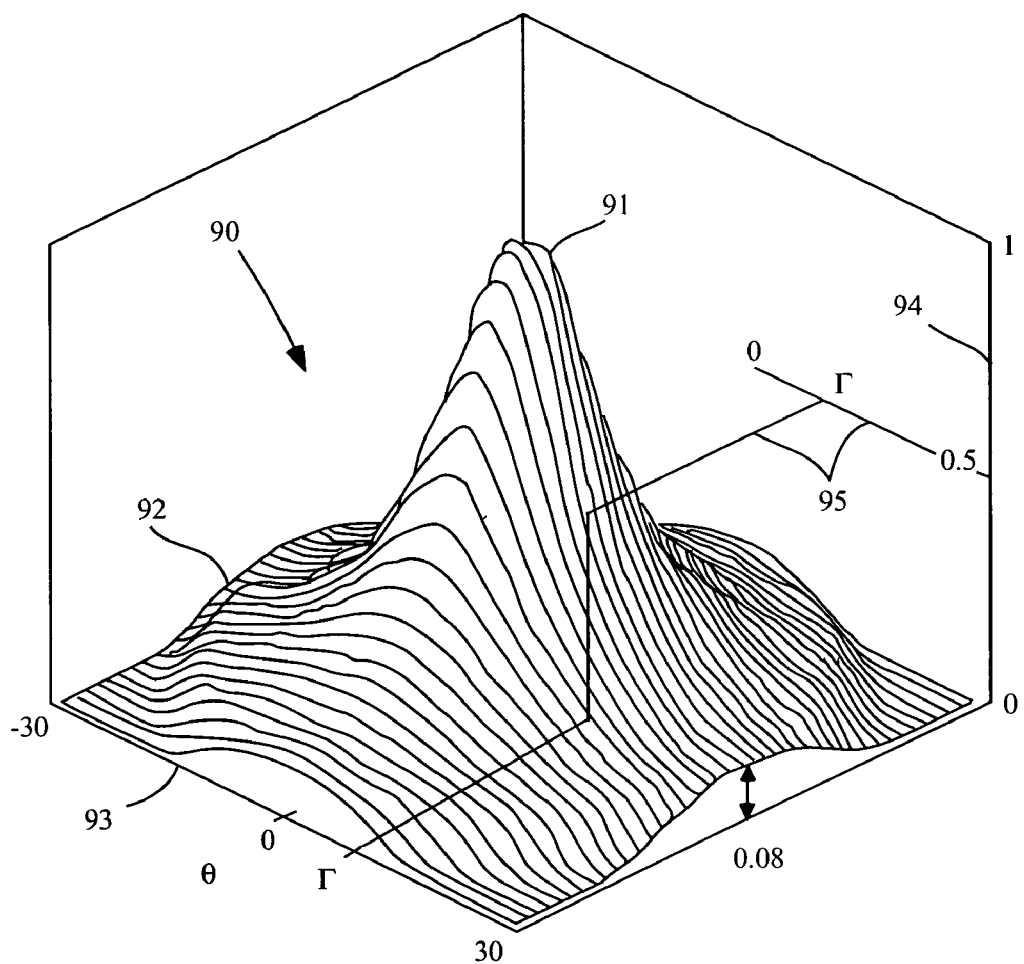
FIG. 9 depicts a representation of the output intensity distribution according to the ray trace of FIG. 8, displaying its Lorentzian distribution.

The radial distribution of deflection angle $\theta[r]$ can be such that the output flux function can be substantially equivalent to $C_I(\theta[r])=C_E[r]$, the latter being of some particular importance in the methods of some of the present embodiments because the illuminance $E[r]$ is often empirically determined and/or estimated from computerized ray traces (e.g., see the ray trace shown in FIG. 9). Thus some uncertainty may result that can cause an actual lens device and/or assembly to be produced with an inaccurate prescription due to errors in the input flux function $C_E[r]$. The intensity prescription $I(\theta)$, however, is typically known a priori, by definition without error. Using two integrations back-to-back can amplify uncertainty, making a particular collimator's output pattern sensitive, for example, to an exact placement of a light source. The embodiments shown herein for uniform illuminance represent some preferred forms that may be modified in actual practice by the design methods disclosed herein. One caveat in measuring the value of illuminance $E[r]$ is that the measurements limit and/or avoid including rays with angles outside a main beam of the collimator. Some collimators, such as a parabolic reflector, have significant amounts of this quasi-stray light.

Regarding the angular divergence of the input collimated beam, one effect to be taken into consideration regarding some methods of cumulative distributions is that the illuminance function $E[r]$ should, in some instances, be specified at the output surface of the collimating lens rather than at the input surface. This is because the angular divergence of the beam can alter the illuminance function $E[r]$ somewhat in the thickness of the lens. Thus, some embodiments employ steps of using an empirically known illuminance function $E[r]$ at the input surface of a lens, deriving a lens contour and then simulating a new distribution $E_L[r]$ for a subsequent derivation of a more accurate lens profile. If the new profile is greatly different from the original, then these steps would be repeated to converge on a solution. The feasibility of this process is an advantage of using a collimated input beam, and enhances the usefulness of the design method of the present invention.

As previously mentioned, from substantially any particular value of the deflection $\theta$, the requisite lens slope $dz/dr$ can be calculated. The lens shape can be accordingly calculated, at discrete positions in a series of N values $r_i (i=1 \ldots N)$, spaced with small increment $\Delta r$, beginning typically with either the edge or the center of a lens. At each radial position $r_i$, the relative encircled flux $C_E[r_i]$ gives a deflection angle $\theta[r_i]$ value, and the local slope $dz/dr$. The integration can simply be via $z[r_i]=(z[r_{i-1}]+\Delta r \, dz/dr)$, as long as $dz/dr$ does not change rapidly with i. Otherwise, a higher-order numerical integration method such as Runge-Kutta can be used.

A particular lens profile is generated for either a converging or diverging lens, the former being convex and the latter being concave. Both types would in some preferred embodiments have planar input faces. While in principle it is possible for two surfaces to produce the deflection $\theta[r]$, the use of two deflection surfaces is typically employed for deflections greater than about 30°. Additionally, a lens with two deflection surfaces usually requires a narrower input beam for performing profile calculations than is needed with lenses having a single deflection surface. The use of a planar surface is typically easier to form and optically polish than an aspheric curve. Further, a lens with an output or upper-surface shape generated for a planar input or bottom surface is suitable as well for integration with a collimator lens having a planar output surface or top surface. Still further, lenses with one planar surface are typically mathematically more convenient, as is fully described below. Accordingly, some of the preferred embodiments disclosed herein have planar input surfaces, but this does not thereby limit the scope of the present embodiments to such shapes.

The central rays of a collimated input beam are typically unaffected by a planar input surface when they enter the lens, so that the central rays encounter the output surface at an incidence angle about equal to the local lens slope angle $\alpha[r]$. The rays thereupon will be refracted to an exiting angle $\beta[r]$, so that the deflection angle $\theta[r]$ is approximately equal to the exit angle minus the slope angle, $\theta[r]=\beta[r]-\alpha[r]$. Utilizing Snell's law, the relationship between the exit angle and the slope angle can be defined by $\sin(\beta[r])=n\cdot\sin(\alpha[r])$ for refractive index n of the lens material, leaving the inverse problem of defining or obtaining a divergence angle $\theta$ from a lens slope angle $\alpha$. At small angles, where $\sin(\alpha)$ is very close to $\alpha$ in value, $\beta$ can be approximated to be $\beta=\alpha$, so that the slope angle can be approximated according to $\alpha=\pm\theta/(n-1)$. At larger angles, the vector form of Snell's law is simplified because the input rays are collimated, giving the lens slope $dz/dr$ according to $dz/dr=\tan(\alpha)=\pm\sin(\theta)/[n-\cos(\theta)]$ which reduces the above calculations for small angles, where the value of $\tan(\alpha)$ is very close to $\alpha$. A lens surface function $z[r]$ can be defined by the integral of the slope $dz/dr$, which is generally not computationally overburdening for small increments of radius r. Numerous preferred embodiments are described herein that are generated by the above method, producing radial profiles of lenses having a generally circular symmetry.

Light distributions can be classified according to ten standard forms, BZ1 through BZ10, according to diverging light distribution defined in the British Zonal system of the Illuminating Engineering Society. Their functional dependence of intensity upon off-axis angle $\theta$ has sufficient variety to encompass most light distributions encountered in actual practice. Table 1 below illustrates the ten light distributions BZ1–BZ10.

TABLE 1

| | Light Distribution |
|---|---|
| TYPE | $I(\theta)$ |
| BZ1 | $\cos^4(\theta)$ |
| BZ2 | $\cos^3(\theta)$ |
| BZ3 | $\cos^2(\theta)$ |
| BZ4 | $\cos^{1.5}(\theta)$ |
| BZ5 | $\cos(\theta)$ (Lambertian) |
| BZ6 | $(1 + 2 \cdot \cos(\theta))$ |
| BZ7 | $(2 + \cos(\theta))$ |
| BZ8 | constant-intensity (isotropic) |
| BZ9 | $(1 + \sin(\theta))$ |
| BZ10 | $\sin(\theta)$ |

As discussed above, some implementations of some embodiments have a practical limit for maximum off-axis angle $\theta_{MAX}$ that is about 30°. According to the present methods, the shape of a lens or lenses can be determined to include a single refracting surface that can generate substantially any of the distributions of Table 1.

The present embodiments provide additional and/or alternative methods of calculating a freeform surface that fulfills a desirable illumination prescription that is not rotationally symmetric given a particular illuminance distribution of the collimated input beam. The prescription is typically continuous and has a limit on how rapidly intensity should change. Although many collimating devices according to present embodiments are circularly symmetric, this is not mathematically necessary with a freeform implementation and/or assembly of the present embodiments. These embodiments can similarly compensate for arbitrary collimated illuminance $E(x,y)$ as they can for two-dimensional intensity prescriptions $I(\psi,\theta)$, where $\psi$ is a horizontal angle and $\theta$ is a vertical angle relative to horizontal forward, for example, as applied to automotive headlight prescriptions.

The present embodiments are able to design a proper lens or lenses so that the illuminance E and intensity I functions are mathematically well-behaved in the fashion known as integrability, which in this case could be described such that substantially any slice of illuminance E or intensity I, made by keeping one variable constant, will not be greatly different for neighboring values of the variable held constant. For example, given a horizon portion (0° vertical) of a lens prescription defined by $I(\psi,\theta)$, it is expected that neighboring functions $I(\psi,-\theta)$ and $I(\theta,+1\theta)$ are not greatly different in height and shape. Similar desiderata can apply to a frontal vertical slice I(0,ψ) and its neighboring vertical slices. In the case of automotive headlights, the vertical slices have faster variation of intensity, so the design is achieved in some embodiments as a swept series of slowly changing vertical profiles, the slope being that which results in the proper deflection of a ray at a point (x,y) into the desired and/or proper direction ((φ,θ)).

When a prescription is factorable, that is when the intensity can be defined by I(ψ,θ)=J(ψ)K(θ), and the input illuminance E[x,y] can similarly be factored, such as E[x,y]=F[x]G[y], some preferred embodiments provide prescriptions with one profile in x, corresponding for example to horizontal angle ψ, and another in y, corresponding to vertical angle θ. The surface of the resulting lens or lenses can be generated by sweeping either profile along a space path defined by the other profile. Due to the nonlinearity of Snell's Law, the corners of such a lens in some embodiments may include modifications to more precisely fulfill the prescription.

As with the circularly symmetric lenses discussed above, cumulative flux distributions are used to generate the requisite deflections (i.e., ψ[x] and θ[y]), but the integrals that define them are typically not those of encircled flux. Instead there are distinct one-dimensional integrals in x and y for the input illuminance, and in ψ and θ for the output intensity.

A typical circularly symmetric but centrally peaked input illuminance, however, would generally not qualify for such separability. Alternatively, illuminance functions F[x] and G[y] can both be made substantially equal to a cross-section of an actual circularly symmetric input. The resulting rectangularly separable lens may be implemented with only minor modification(s) near the corners of the lens to better utilize the actual circularly symmetric input illuminance. Additionally, some of the corners may not be used in a circular device anyway. Some preferred embodiments of these configurations can be utilized for example in automotive headlamps.

With a particular luminaire as the source of collimated rays, a non-imaging lens of some of the present embodiments that fulfills a particular prescription can be designed by generating several theoretical candidate profiles in a series, the ray traces of which converge to the prescription. This is due to the divergence of light in the collimated input beam causing departures from the prescribed output pattern. This recursive process of dealing with the irregularities of a source and luminaire is typically implemented through accurate computer modeling of both, including the geometry of the luminaire and the photometric details of the source's emission. Photometric information can be inputted to the computer as a set of light-ray origins randomly located according to statistics generated by the source characteristics, and random directions with statistics similarly generated. Such photometric information can be commercially generated from a set of multiple images of the emitting source, for example by Radiant Imaging Corporation of Duvall, Wash.

FIG. 1 depicts diverging lens 1 and generally spherical screen 2 representing the angle space of a far field. Both are depicted by a radially organized mesh that represent circular symmetry. Exemplary rays 3 and 4 are collimated rays encountering lens 1 in parallel and diverging therefrom to strike the screen 2. The flux assignment of rays can be seen in how ray 3 travels from location 5 on lens 1 to the corresponding location 6 on screen 2, and in how ray 4 travels from location 7 on lens 1 to the corresponding location 8 on screen 2. This correspondence is established through a flux map from lens 1 to screen 2.

Figure 2:
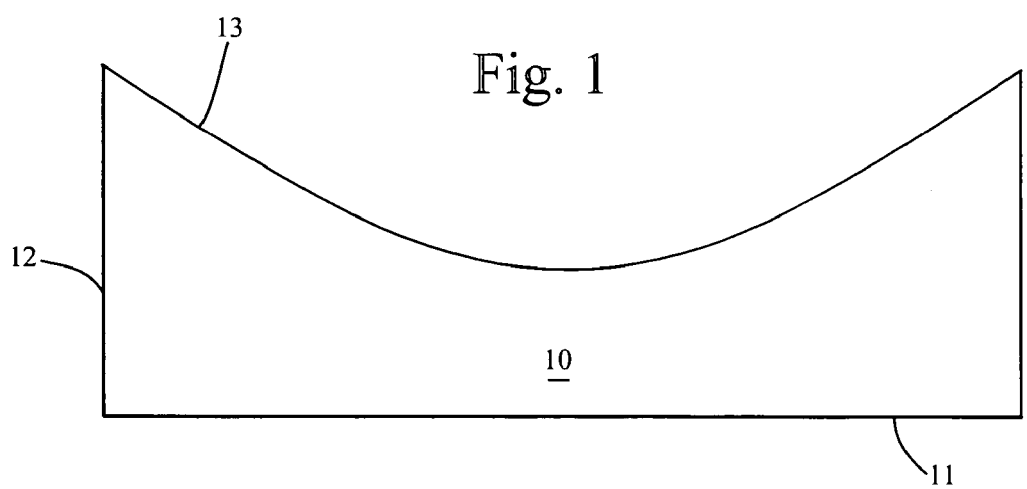
FIG. 2 depicts a cross-sectional view of a plano-concave lens that refracts collimated-beam illuminance into illuminance on a distant plane.
Figure 3:
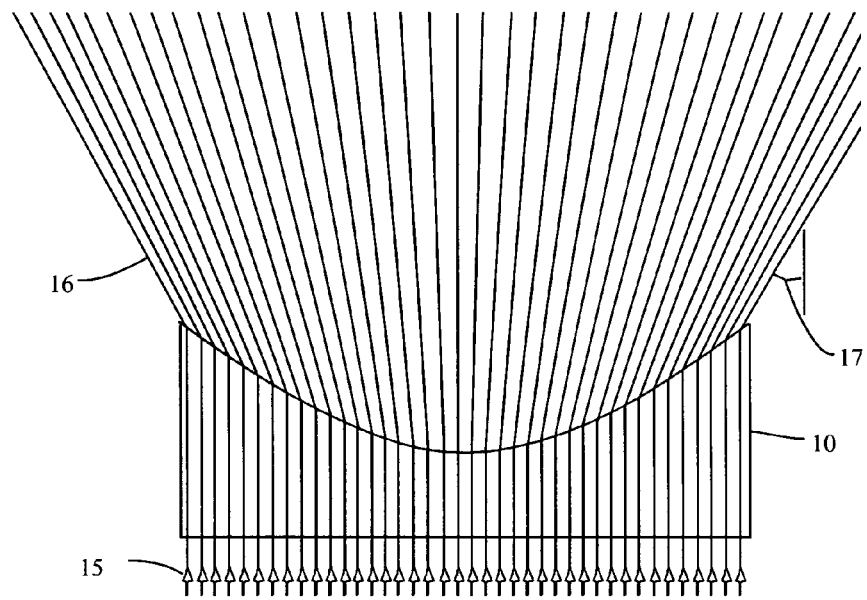
FIG. 3 depicts the concave lens of FIG. 2 showing the refractive action of the lens.

Beam divergence can be established though diverging or converging lenses. FIG. 2 shows a cross section of concave lens 10, with flat bottom 11, cylindrical sidewall 12, and specifically shaped concave top output surface 13. FIG. 3 shows the concave lens 10 of FIG. 2, illuminated by uniform collimated beam 15, which is refracted into diverging beam 16. The divergence can be specifically determined. For example, the lens 10 can be configured to provide a divergence that conforms to a $\cos^{-3}\theta$ intensity prescription for uniform illuminance on distance planes orthogonal to the beam. Edge divergence angle 17 of the beam of FIG. 3 is near a maximum feasible for a single refraction, of about 30°. Thus, many preferred embodiments and/or implementations do not need as much divergence and will be relatively less thick than the lens shown in FIGS. 2 and 3.

Figure 4:
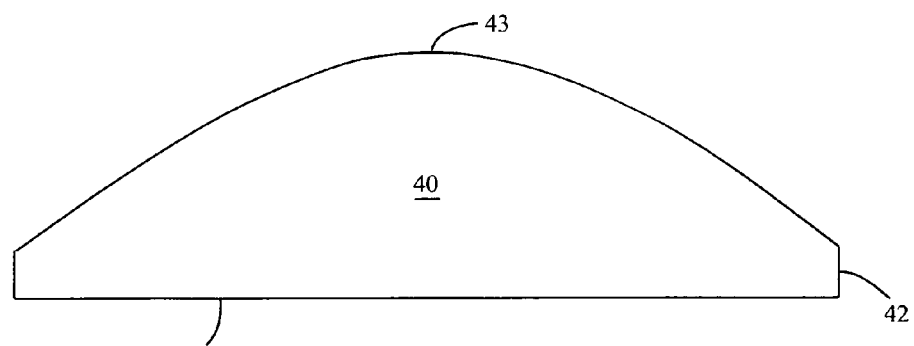
FIG. 4 depicts a cross-sectional view of a plano-concave lens that refracts collimated-beam illuminance into illuminance on a distant plane.

FIG. 4 shows a cross-sectional view of a plano-convex lens 40. The lens 40 can have a planar side or surface 41, generally cylindrical side 42, and concave profile 43. The concave surface can have a profile that is similar to, and in some embodiments, substantially exactly the same as the profile of the lens 10 shown in FIG. 2, but inverted or upside down. The refracting action of the lens 40 is converging rather than the divergence shown in FIG. 3.

Figure 5:
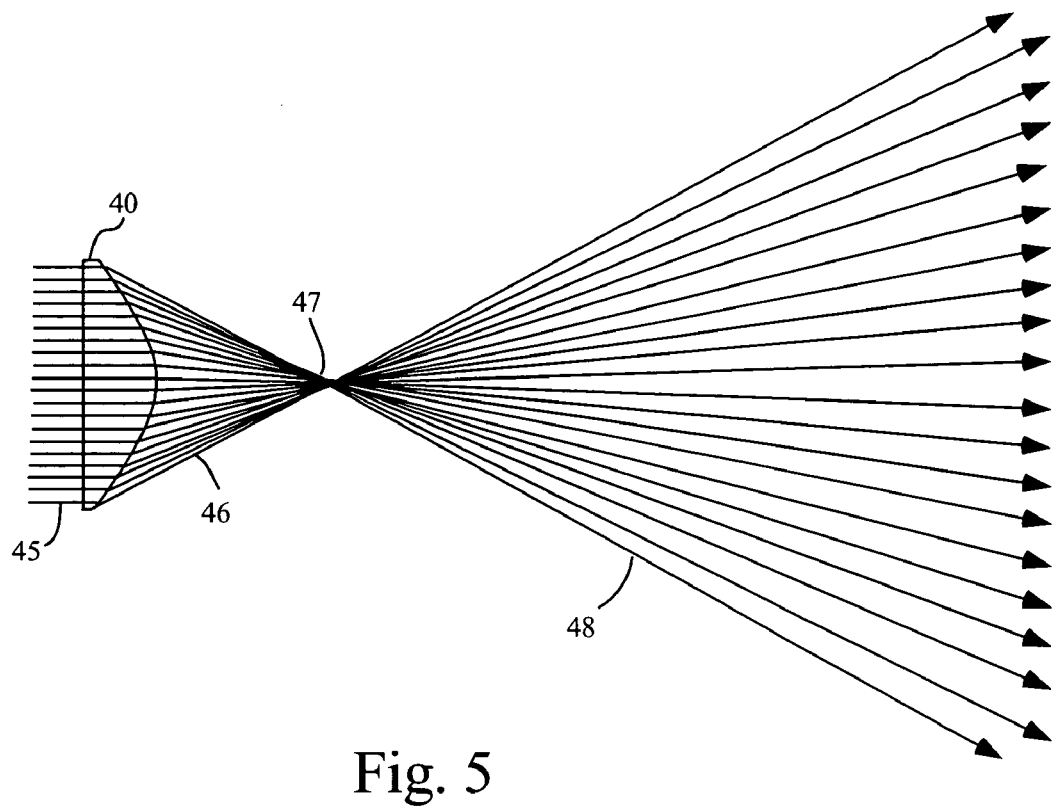
FIGS. 5 and 5a depict the lens of FIG. 4 and further shows the refractive action of the lens.

FIG. 5 depicts the action of lens 40 upon collimated input beam 45. The converging refractive power of lens 40 forms converging beam 46, which passes through caustic 47 to form diverging beam 48, having the same far-field intensity pattern as that of FIG. 3. Such a converging beam is more eye-catching when slightly scattered, as during passage through thin smoke. More practically, a convex lens uses about half the material of its concave counterpart, which also needs a minimal center thickness that is often greater than the minimal edge thickness of the convex lens. Accordingly, the present embodiments will be described below with reference to one or more convex lenses. However, concave lenses could be employed.

Caustic 47 is of the cusp type, similar to those appearing in cylindrical glasses of water. It is indicative of the difference between imaging and illumination optics. An image-forming lens would have a tiny, diffraction-limited caustic corresponding to the ideal point image formed by a collimated beam encountering a plano-hyperbolic lens. The present embodiments, however, typically provide for an extended caustic 47 that is a by-product of utilizing a converging lens to fulfill a diverging illumination prescription. Essentially, lens 40 maps from position to direction, through an inversion in angle space that highlights its nonlinearity.

Figure 5A:
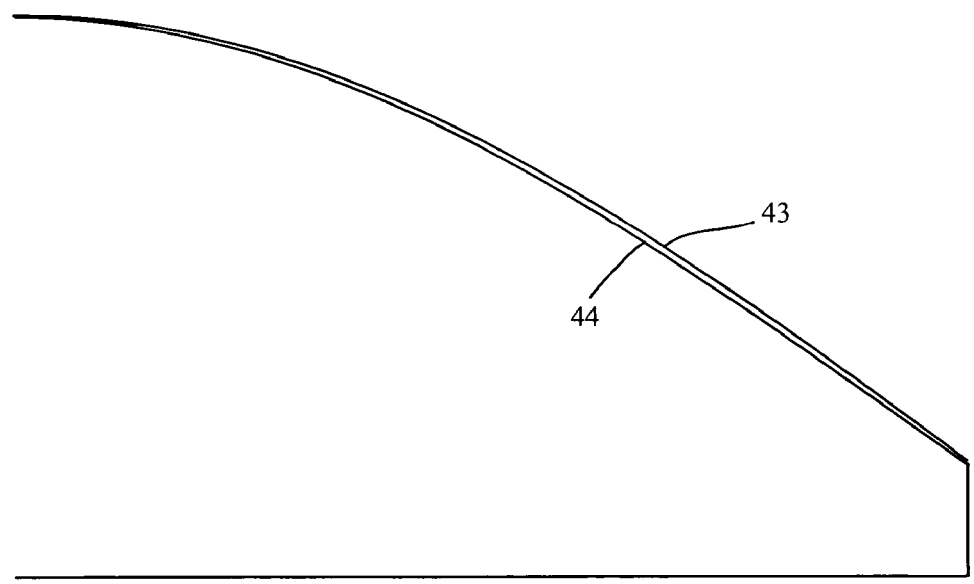
Figure 6:
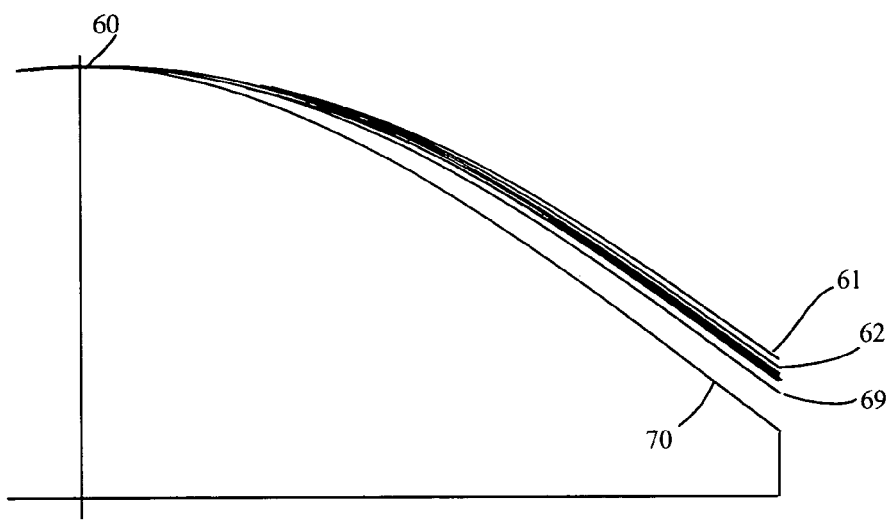
FIG. 6 depicts a series of lens profiles fulfilling the British Zonal system of far-field distributions.

The difference between an illumination lens and a perfectly focusing hyperbola is shown in FIG. 5a. Convex profile 43 is substantially identical to the profile 43 of lens 40 of FIG. 4, and differs slightly from hyperbola 44, which has the same diameter and edge slope, and hence the same focal length. In fact, their profiles are quite similar and form a series of increasing convergence power, with the prior lens of FIG. 2 being the equivalent of BZ9. FIG. 6 shows these BZ profiles, defined around a common axis 60 of rotational symmetry. Profiles 61 through 70 correspond respectively with the light distributions BZ1 through BZ10 of Table 1.

Another useful light distribution or prescribed intensity pattern utilized in some of the present embodiments is the Lorentz distribution, characterized by the angle Γ at which intensity I(θ) is half the central maximum $I_0$: $I(\theta)=I_0\Gamma^2/(\theta^2+\Gamma^2)$. This Lorentz distribution can be used to approximate a horizontal falloff in a desired prescription. For example, some present embodiments can provide lenses with prescriptions that satisfy automotive headlight specifications, where the Lorentz distribution is specified as having a falloff of $\Gamma=9°$. This relatively rapid falloff (i.e., a falloff of intensity to half in only 9°) typically means that the lens will be less convex.

Figure 7:
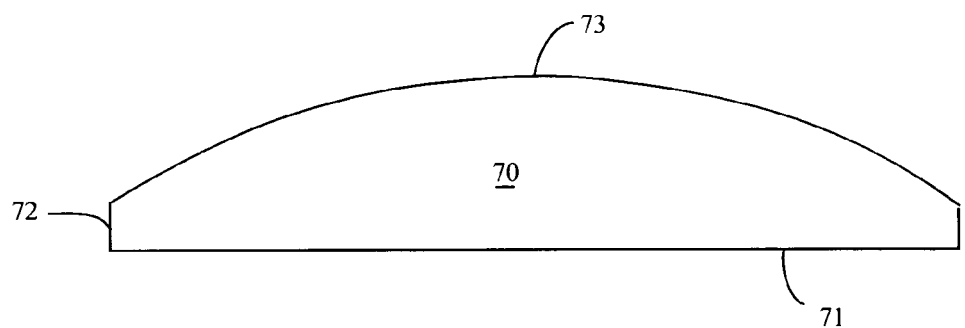
FIG. 7 depicts a lens profile producing a Lorentzian distribution with a desired half angle.

FIG. 7 depicts the cross-section of a lens 70 according to some preferred embodiments with a profile generated by the present methods to satisfy a Lorentz distribution falloff of $\Gamma=9°$. Plano-convex lens 70 comprises an input planar surface 71, cylindrical sidewall 72, and convex output surface 73. Because the lens has been implemented to satisfy this Lorentzian distribution of $\Gamma=9°$, at 30° the distribution has an intensity of only about 8% of a central intensity, and thus relatively fewer rays diverge at 30°. The profile of lens 70 can be generated circular and its deviations therefrom can be small on the scale of FIG. 7.

Figure 8:
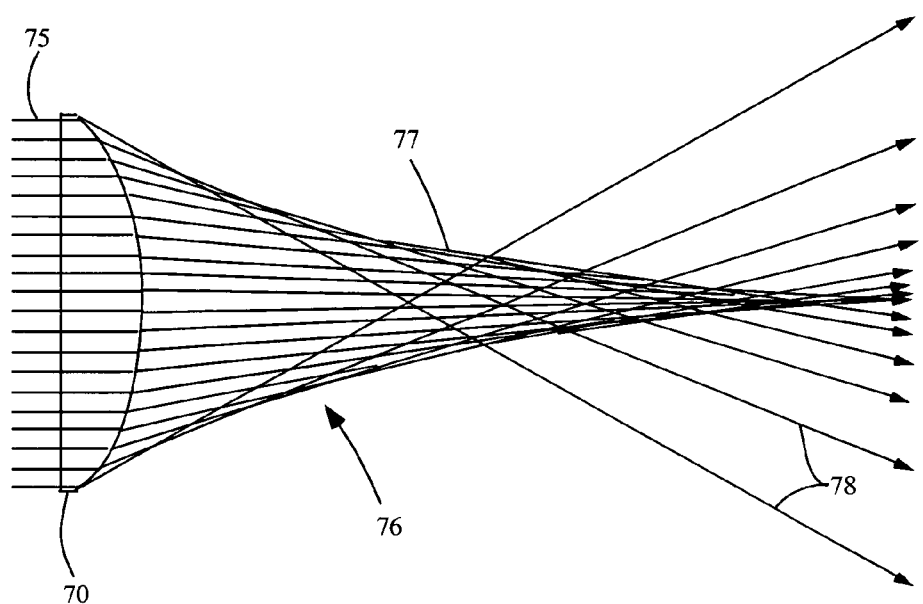
FIG. 8 shows a refractive action of collimated rays being passed through a lens that refracts the rays.

FIG. 8 depicts a trace of collimated rays 75 being passed through the lens 70. The rays 75 become a converging bundle 76 with outer envelope 77, comprising rays remaining as outermost rays, exemplified by rays 78, that are shed into the outskirts of the Lorentzian distribution.

FIG. 9 depicts a graphical representation of a normalized intensity distribution 90 resulting from the lens 70 of FIGS. 7 and 8 according to the defined profile to establish the desired falloff of $\Gamma=9°$. It will be apparent to those skilled in the art that other profiles can be defined according to the present embodiments to establish alternate distributions. Graphical surface 90 has peak 91 at unity value and edge value of 0.08 at $\theta=30°$, shown as skirt 92. The angular scale 93 of FIG. 9 includes the Lorentzian half-width $\Gamma$ equaling 9°, while the normalized vertical scale 94 runs from 0 to 1. Cartesian readout lines 95 graphically show the attainment or determination of the falloff half value at the desired 9°.

Most collimators typically have non-uniform illuminance. Of particular interest for the application of the present embodiments is the total internally reflecting lens (TIR), such as the TIR lens as exemplified in U.S. Pat. No. 4,337,759 (1982) by Popovich, Parkyn, and Pelka, incorporated herein by reference in its entirety. In such a collimator, the center is closer to the source than the edge, so that edge illuminance can be much lower than at the central region. To compensate for non-uniform illuminance, some preferred embodiments profile lenses with a different lens profile than that of FIG. 7.

Figure 10:
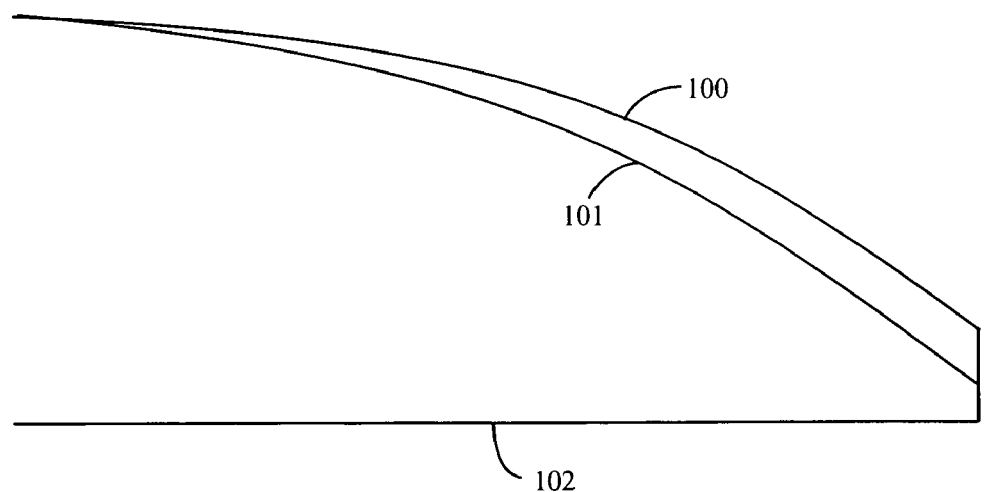
FIG. 10 depicts the profile of the lens of FIG. 7 and a lens that generates the same Lorentzian output distribution from a more peaked input illumination than the uniform input illumination applied to the lens of FIG. 7.

FIG. 10 depicts the profiles of two lenses that produce substantially the same Lorentzian output intensity as the lens of FIGS. 7–9. The lens 102 has a profile 101. For comparison, profile 100 is shown, which is the same profile as lens 70 in FIG. 7, for uniform input illumination. Profile 101 alternatively is defined for the particular non-uniformity of input illumination that is generated by a TIR lens that has a flat or planar output surface (e.g., surface 123, see FIG. 12).

Figure 11:
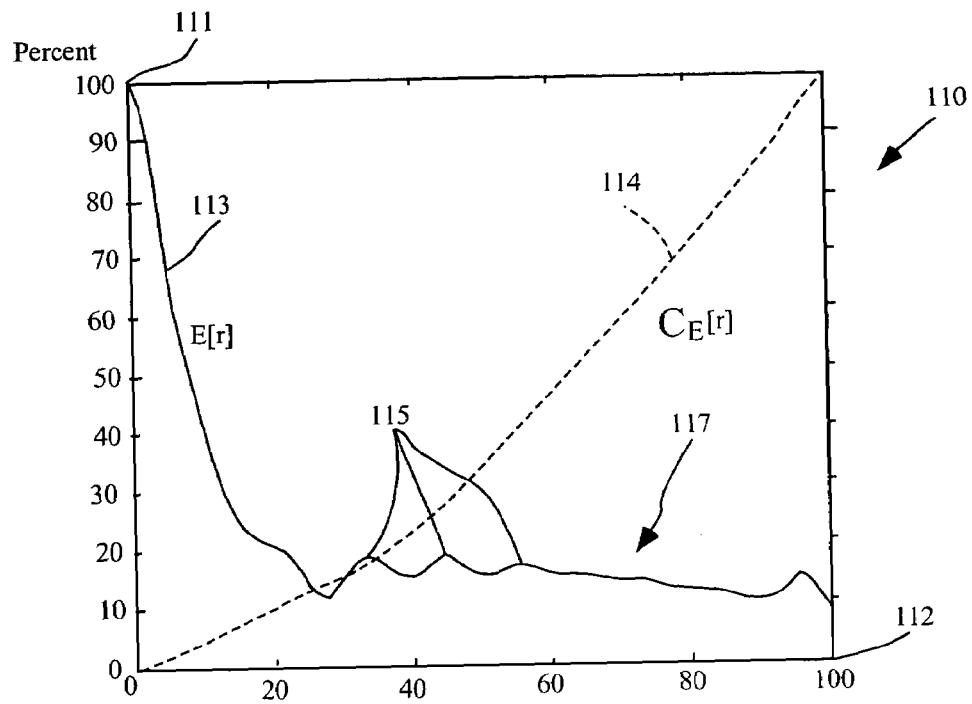
FIG. 11 depicts a graphical representation of an input illuminance distribution used to generate the profile of FIG. 10.

FIG. 11 depicts a graphical representation of a particular input illumination profile used to calculate and/or determine the profile 101 of lens 102 of FIG. 10. Graph 110 has percent-scaled axes, horizontal 111 and vertical 112. Horizontal scale 111 indicates radial position from center to edge of the collimated input beam. Vertical scale 112 indicates illuminance relative to the maximum, at center. Solid line 113 shows collimated illuminance E[r] and dotted line 114 shows encircled or cumulative flux $C_E[r]$. Line 113 shows a strong central peak and a wide conical shoulder 117 about a sixth the height of the peak. Ripples 115 are the type of illuminance E[r] detail that has very minor influence upon the cumulative function $C_E[r]$.

Figure 12:
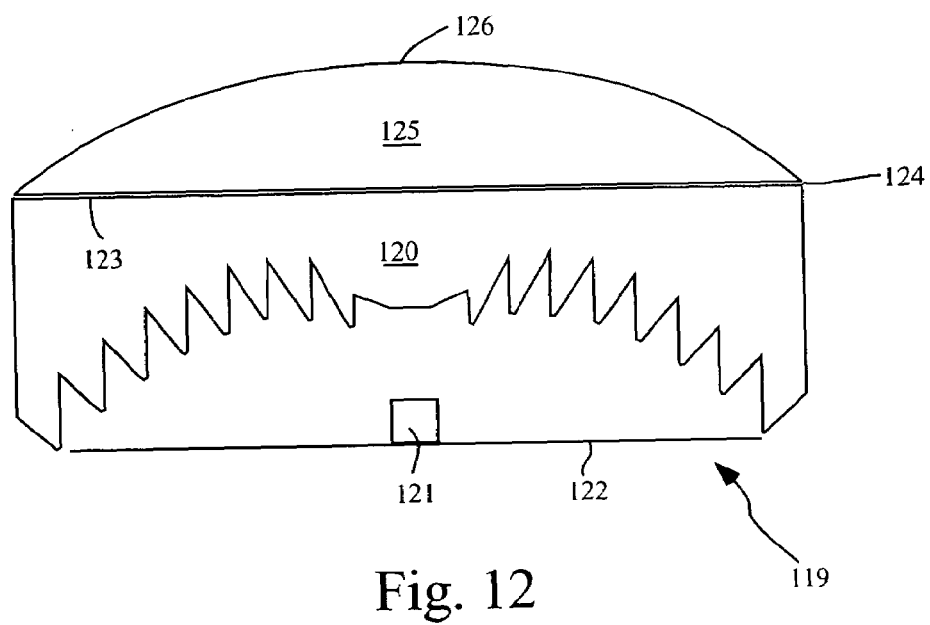
FIG. 12 depicts the cross sections of a computer modeled lens assembly 119 that can generate the graph of FIG. 11.

FIG. 12 depicts the cross sections of a computer modeled lens assembly 119 that can generate the graph of FIG. 11. TIR lens 120 surrounds cubical light source 121, which in some embodiments can be the same shape as an LED chip. To better maximize efficiency of light utilization, planar mirror 122 is positioned to reflect down-going light back up to lens 120. An air-gap 124 was utilized in the computer modeling in an attempt to eliminate stray light, through total internal reflection by upper face 123 of the TIR lens 120. Output or upper surface 126 of converging lens 125 is similar in shape to profile 101 of FIG. 10, and utilized in the computer modeling acts as the collector surface to generate the illuminance field and/or profile plot in FIG. 11. This illuminance field E[r] is transformed by refraction at upper surface 126 into a desired Lorentzian intensity distribution or pattern, such as the distribution 90 of FIG. 9. Typically, more light at a center or central area of a lens results in more refractive deflection, which in turn typically requires more lens curvature. This demonstrates, at least in part, why an output profile 101 is utilized with the input illuminance distribution graphically depicted in FIG. 11, instead of the profile 100 of lens 70 used for uniform input illuminance. In some embodiments of the assembly 119, the air gap 124 is eliminated so that lenses 120 and 125 would be a single piece.

The Lorentzian intensity distribution is not necessarily limited to lenses with circular symmetry. Similarly, many of the present methods do not require the generation of an intensity distribution, for example, the distribution 90 of FIG. 9, to accurately determine a desired profile. As such, the Lorentzian intensity distribution may not have been used in the circularly symmetric fashion depicted in FIG. 9. Alternatively, the value of the intensity distribution is that, at least in part, the distribution can be used to approximate a desired distribution to be produced by a horizontal slice through a desired lens prescription, such as a horizontal slice through an automotive-headlamp prescription.

Figure 13:
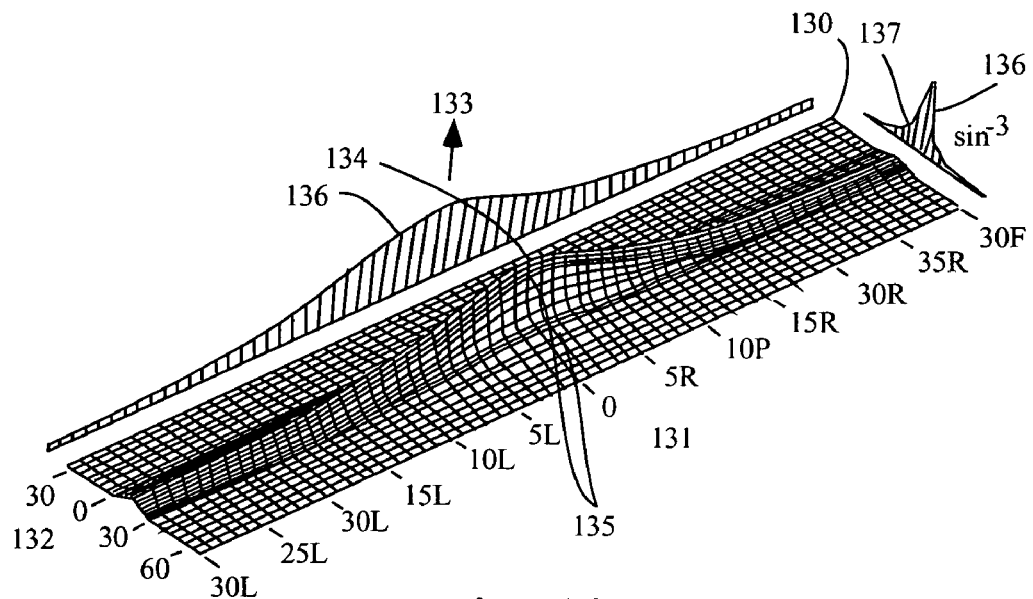
FIG. 13 depicts a graphical representation of a non-circularly symmetric output intensity distribution.

FIG. 13 is an example of a perspective three dimensional view of a graphical-surface representation 130 of an intensity distribution from a lens that can be employed as a vehicle headlight according to some embodiments, which graphs separable intensity prescription $I(\psi,\theta)=J(\psi)K(\theta)$. The graph 130 includes a first axis 131, depicted as left-right horizontal axis 131, for angle $\theta$ and a second axis 132, depicted as up-down vertical axis 132, for angle $\theta$. These axes form the base plane for orthogonal axis 133, scaled for percent relative intensity, maximum of unity at center peak 134, located at about 1.5° down. In some embodiments, representative horizontal slices 135 can each have Lorentzian profiles 136 of substantially identical shape $J(\psi)$ (i.e., parameter $\Gamma=9°$) but varying relative heights. The vertical profile of $K(\theta)$ comprises a $\sin^{-3}\theta$ shape of distribution 136 for the down angles, for example to provide constant roadway illuminance. The up angles can have distributions 137 with, for example, rapid falloff to nearly zero (e.g., in only about three degrees), which represent the angle above horizontal at which drivers of other vehicles would receive unacceptable glare. The present invention can fulfill this cutoff as long as the input collimated beam is generally narrower than between ±0–5°, preferably between ±1–2°.

Figure 13A:
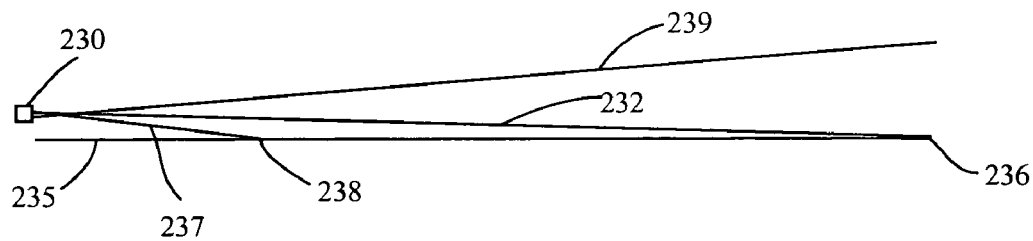
FIG. 13a depicts the derivation of the vertical profile of FIG. 13.

The derivation of this standard can be seen in FIG. 13a, showing headlamp 230 at unit height above roadway 235 and shining on it with low-beam maximum along line of sight 232, 1.5° below horizontal, striking the roadway at point 236. Lowermost line of sight 237 is 6° below horizontal, striking the roadway at point 238. Uppermost line of sight 239 is 2° above horizontal.

The present embodiments provide lenses that can fulfill this distribution. These lenses can employ a horizontal profile like the Lorentzian-generating shape of FIG. 7, but with a different vertical profile that is shaped to generate the distributions 137 of FIG. 13. As long as most of the deflections are under the 30° maximum, the cross-sweeping product of the horizontal and vertical profiles generates a lens surface fulfilling the prescription of FIG. 13. Although this cross-sweeping process generates a rectangular surface, a circular collimated input beam means that only a circular slice might be used out of this rectangularly generated convex lens surface.

Figure 14:
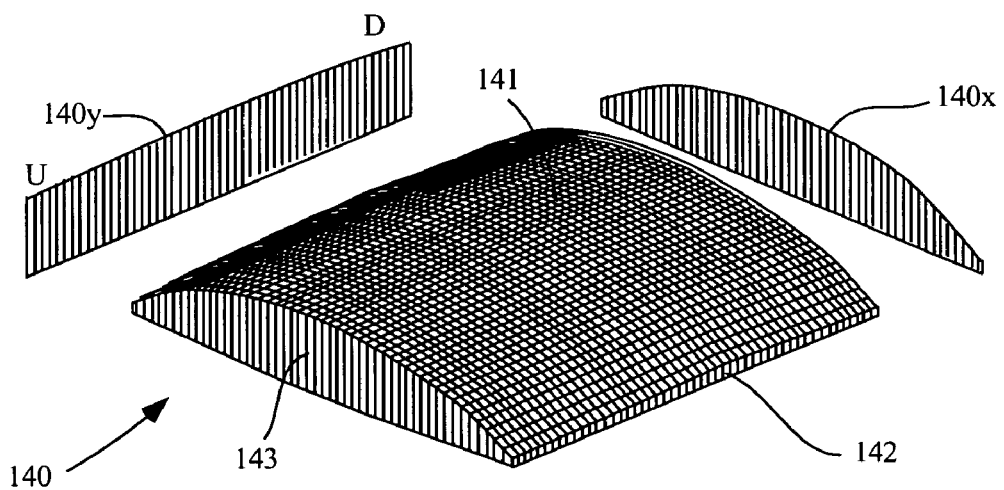
FIG. 14 depicts an illumination lens that can be employed to fulfill the prescription of FIG. 13.

FIG. 14 depicts lens 140 with top surface 141 generated by the described cross-sweeping method. The lens 140 includes a convex central profile 140x that extends horizontally and generates at least a portion of the Lorentzian intensity distribution 136 of FIG. 13. Further, the lens 140 includes a less convex central-profile 140y that extends vertically and generates the narrow vertical intensity distribution 137 of FIG. 13. One or more flat side surfaces 142 of the lens can bound the lens horizontally. Slightly curved sides 143 can bound the lens vertically. This small distortion can be introduced as a result of the toric sweep of profile 140x involving a small tilt due to shallow profile 140y.

Figure 14A:
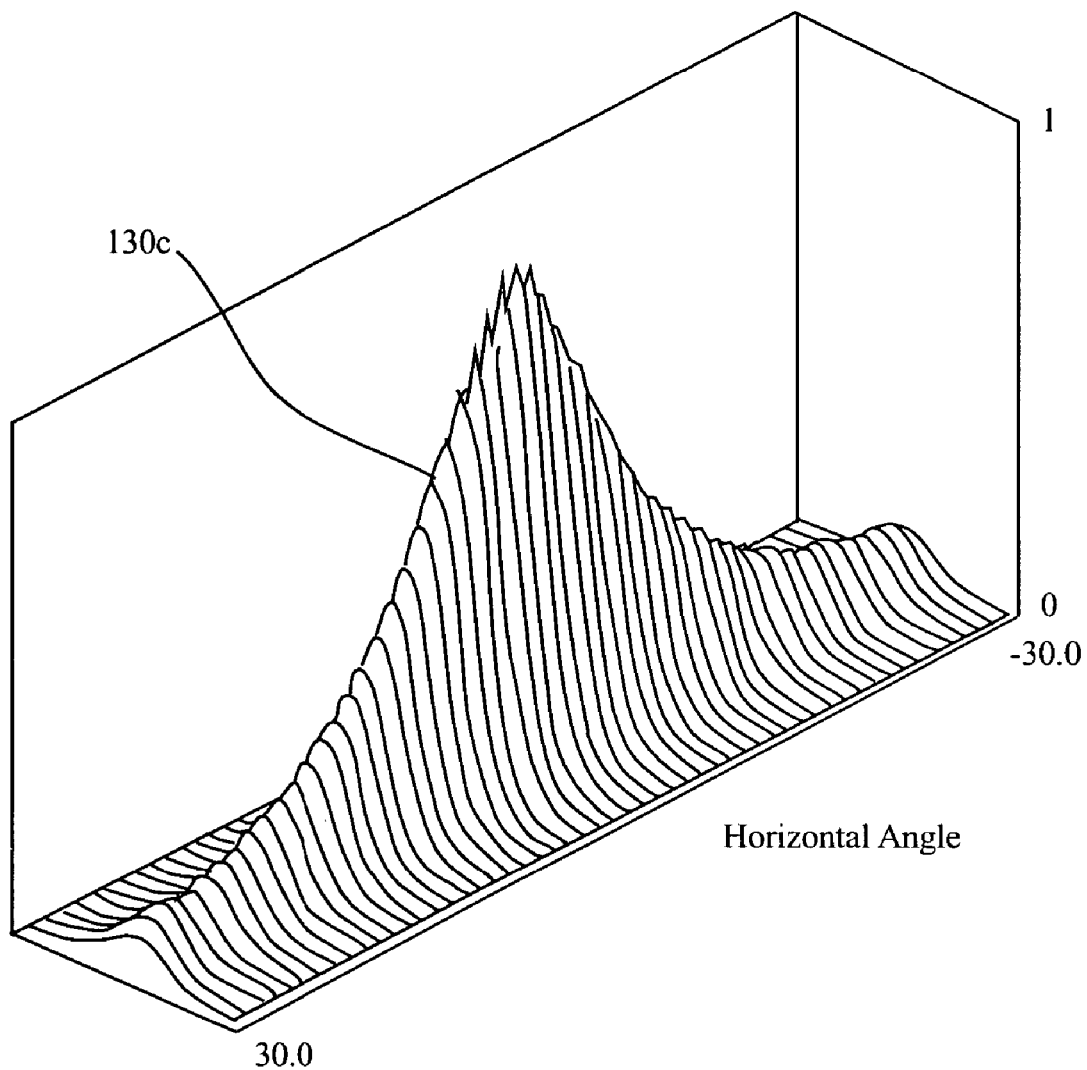
FIG. 14a depicts flux distribution generated by a computerized ray trace of parallel rays refracted by the lens of FIG. 14.

FIG. 14a depicts flux distribution 130c generated by a computerized ray trace of parallel rays refracted by lens 140 of FIG. 14. Though the vertical scale of the lens is higher, its shape can be seen to be basically the same as prescription 130 of FIG. 13, indicating an accuracy of the resulting distribution for lens 140.

Figure 15:
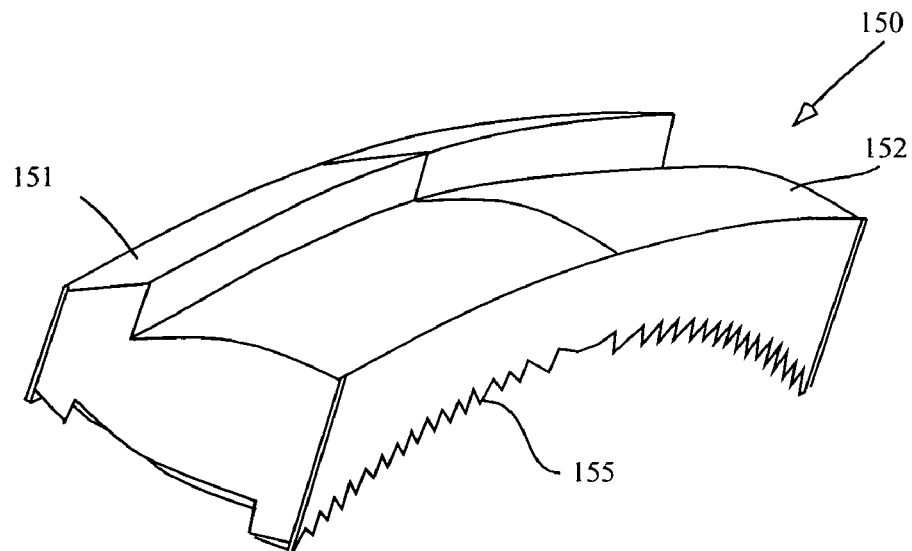
FIG. 15 depicts a lens according to some embodiments fulfilling the prescription for an automotive daylight running lamps.
Figure 15A:
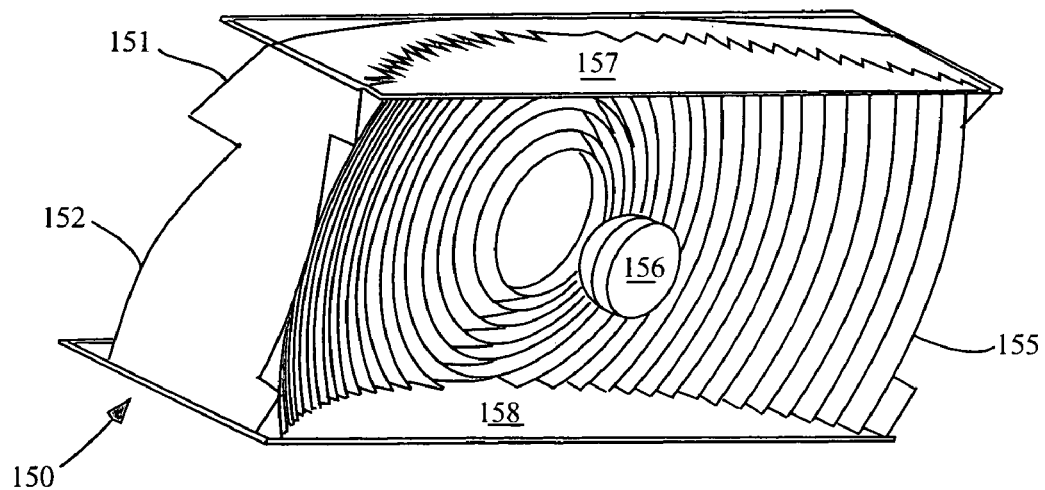
FIG. 15a shows the lens of FIG. 15 from a view showing the TIR lens.

FIG. 15 depicts an alternative preferred embodiment of a lens 150 generated according to the present methods for use in vehicle headlights. Rectangular illumination lens 150 comprises obverse output surfaces 151 for positive θ and 152 for negative θ. The surfaces 151 and 152 can be generated to satisfy prescriptions to achieve the desired intensity distribution as described above. The lens 150 can further include a grooved collimating TIR lens 155 portion. FIG. 15a shows the lens 150 from a view showing the TIR lens 155. Light source 156 is shown at the focal point of TIR lens 155. Sidewalls 157 and 158 give structural rigidity and in some embodiments can further reflect light to the TIR lens. This particular lens configuration can fulfill the automotive prescription for daylight running lamps, when source 156 has sufficient luminosity, for example when implemented with Luxeon white-LED lamps by Lumileds Corporation. In some embodiments, multiple lenses 150 are cooperated together or combined to achieve a desired total output intensity pattern. For example, multiple lenses 150 can be secured together so that a resulting output beam achieves a desired intensity.

The present embodiments provide lenses and/or lens assemblies that can have numerous applications. As discussed above, some applications can be for automotive headlamps. Other embodiments provide lenses or lens assemblies for oblique illumination of walls, so called wall-washing, which in some implementations is achieved through narrow-beam lamps placed to illuminate the desired areas, for example, recessed in an interior ceiling placement, recessed in an exterior ground placement, positioned over paintings or other such placement. Such applications benefit from the efficiency and compactness afforded by the present embodiments. Other lighting systems typically produce elliptical illumination patterns, which are used to illuminate areas, such as rectangular areas and/or items of interest (e.g., paintings on a wall). Because of the elliptical shape of the illumination, these areas are not fully illuminated leaving their corners dark and/or large amounts of area surrounding the area of interest are being illuminated, resulting in wasted light.

Figure 16:
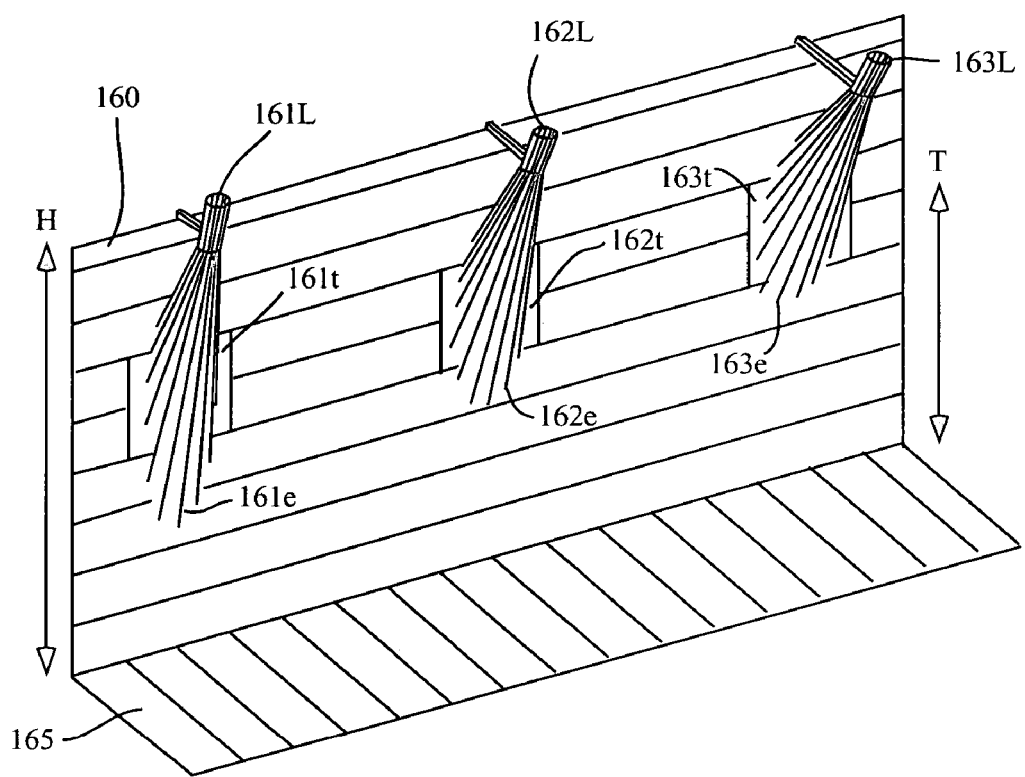
FIG. 16 depicts wall-wash illumination geometry and the inadequate illumination.

FIG. 16 is a perspective view that depicts a wall-washing situation. Vertical wall 160 has identical square target zones 161t, 162t, and 163t, respectively, 2' on a side, centered at height T of 5' above floor 165. Luminaires 161L, 162L, and 163L are located at ceiling height H of 8'6", and aimed wall-ward to illuminate targets 161t, 162t, and 163t respectively. Representing successively less oblique presentations, they lie at different distances, respectively 1', 1'6", and 2', resulting in desired aim angles of 16°, 27°, and 34° respectively. Superimposed on each target are vertically elongated ellipses 161e, 162e, and 163e respectively, representing the illumination patterns of lamps of the other devices, such as the MR series, with beam divergence shown of 8° and compensatory upward aim-change of 2° from the desired aim at the center of the target. The circular symmetry of their output beams fails to match target rectangularity, delivering a non-uniform illumination pattern that spills wastefully below the target while leaving lateral parts of it dark, or not illuminating portions.

The present embodiments provide several alternative implementations and/or avenues to provide improved and/or more efficient lighting. Some preferred embodiments disclosed herein have in common a functional splitting of the lens into different halves for the upper and lower parts of a targeted area. Their illumination of target corners can attain at least half the central illuminance, without the beam spilling above and below the targeted area. For example, one embodiment can achieve a desired illumination of a generally rectangular area, by providing a circular preferred embodiment organized in differing sectors, with different radial profiles having substantially no or small discontinuities between the profiles in either height or slope. As another example, a square preferred embodiment can include a top surface generated by a scanning-style algorithm, which can adapt to circularly symmetric non-uniform input-illuminance.

Figure 17:
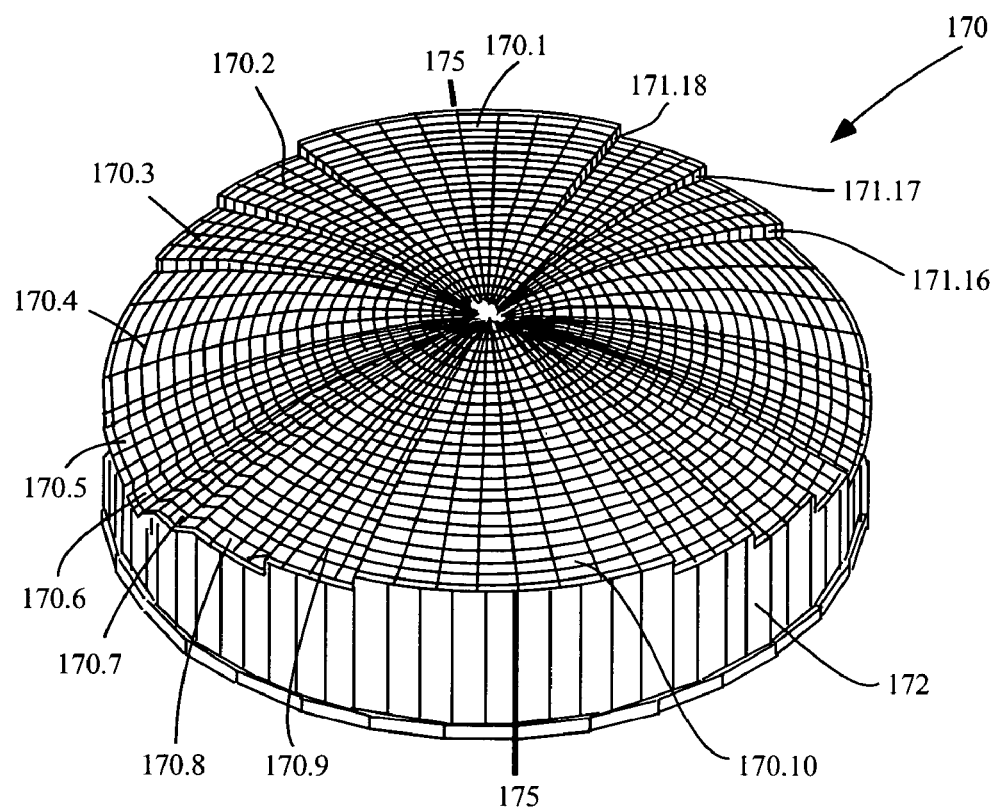
FIG. 17 depicts a circular lens with varying radial profile according to some present embodiment.

FIG. 17 depicts wall-washing circular lens 170, with cylindrical sidewall 172. A top surface of the lens 170 is organized into azimuthal sectors 170.1 through 170.18, with those to the right of plane of symmetry 175 not numbered (except of 170.1 and 170.10). Sector 170.6 can correspond to a near corner of a target, the direction to which subtends the largest angle from the direction to the target center. Thus, the profile of this portion of the lens, section 170.6, is generally the most convex so as to bend the light to the near corner of the target. Each sector is tasked to illuminate corresponding sectors of obliquely presented square target 163t shown in FIG. 16. The lens 170 includes vertical discontinuities 171, where only three discontinuities are labeled 171.16–171.18. These discontinuities lie between the sectors.

Figure 17A:
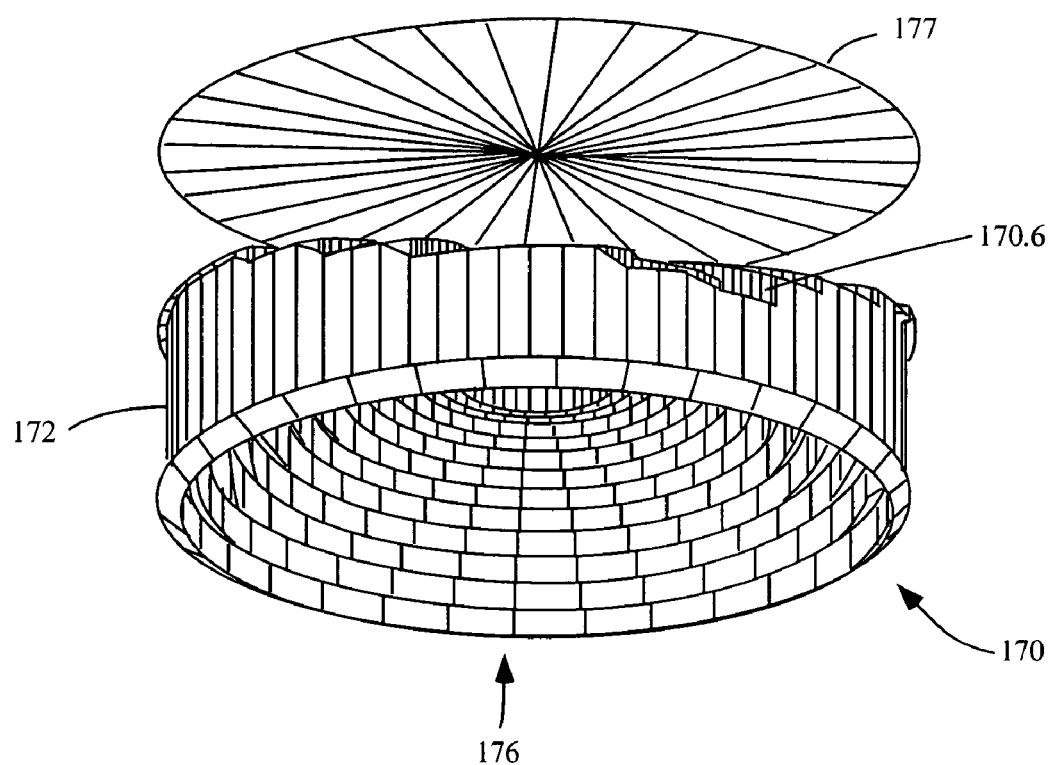
FIG. 17a depicts a bottom view of the lens of FIG. 17 with a TIR lens.

FIG. 17a depicts an alternate view of a bottom or TIR lens 176 of the lens 170 of FIG. 17. An auxiliary holographic diffuser filter 177 can be utilized in some embodiments to reduce non-uniformity of target illumination. It is shown at an exaggerated distance above lens 170, but could also be incorporated onto the lens surface. Additionally and/or alternatively, the lens 170 can be formed from a plurality of lenses. Similarly, a plurality of lenses 170 can be combined or cooperated to produce a desired output beam.

These embodiments that illuminate rectangular areas can also be utilized in other implementations. For example, these embodiments might be utilized to illuminate stairs or steps by luminaires in the riser, positioned only a short distance above the step itself, while still illuminating an obliquely presented rectangle in a relatively even manner.

Some embodiments utilize a scanning-style algorithm to enforce continuity by allowing a limited amount of non-uniformity by allowing a limited amount of non-uniformity of illuminance of a square target, as long as the non-uniformity is gradual and spillover is minimized. These embodiments can include vertical center-profile that include upper profiles and lower profiles. The vertical center profile can be generated first according to the refractive deflections desired to illuminate uniformly a centerline of an obliquely presented square target. A central aim-axis can pass through a central target-point. A bilaterally symmetric horizontal center-profile can be curved to generated refractive deflections to illuminate a centerline of the target. With these two central profiles generated, successive adjacent profiles are generated therefrom, exemplified by a plurality of intermediate vertical profiles.

Extensions of these methods to generate illumination patterns for rectangles and for diagonal oblique presentations would be obvious in the light of the above disclosures.

Some present embodiments provide a functionally separate lens that transforms collimated light. These lenses can be achieved through processes and methods of the present embodiments for use in designing and/or manufacturing optical devices. The methods in some embodiments generate a two-dimensional representation of at least one active optical surface of an optical device and rotationally sweep this two-dimensional representation about a central axis, thereby providing a three-dimensional representation of the desired optical device.

In another embodiment, the invention can be characterized as a method for generating an optical beam with intensity distribution that fulfills a given prescription. Generally the beam is generated from a collimated beam of known illumination cross-section.

In an additional embodiment, the invention can be characterized as a method of manufacturing an optical device that converts a first distribution of compact-source input light to a second distribution of output light, and symmetrically extending a two-dimensional representation of said optical surface to provide a three-dimensional optical device. In an added embodiment, the invention can be characterized as an optical device that converts a first distribution of an input radiation to a second distribution of output radiation, comprising first, second surfaces that are defined by a two-dimensional representation that is symmetrically extended to provide a three-dimensional device.

The present embodiments provide numerous lenses and/or assemblies that allow for additional degrees of design-freedom by, in part, varying the shape of a lens cross-section to give a freeform surface. Some embodiments additionally and/or alternatively provide illumination, and in some embodiments transmit light originating from a central light source. In some embodiments, the lenses and/or lens assemblies can comprises a single piece of specifically configured transparent dielectric. Some present embodiments can be integrated with a collimator, including a light source.

Several embodiments are configured for use with LED optical emitters. In the near-infrared regime (e.g., 700–1000 nm), night-vision illuminators based on the present embodiments can be implemented to use commercially available near-infrared LEDs as light sources for lenses that can be molded and/or formed from glass, plastics, silicon and other materials, in the same manner as for visible-light illuminators. The present embodiments can be equally applied to near-ultraviolet LEDs, which for example may soon be prominent as primary light sources for exciting visible-light phosphors.

Several embodiments can be manufactured by injection molding of transparent polymeric plastics such as acrylic, polycarbonate, polyarylate, and cyclo-olefins and/or other similar materials. The latter group, for example, can be used at high operating temperatures, for example at 161° C., typically 140° C., as exemplified by a cyclo-olefin based product Zeonor 1600R, produced by Zeon Corporation of Japan.

Several other embodiments can be utilized at high temperatures. The lenses can be made of glass, silicone or other similar transparent or partially transparent materials retaining their form at elevated temperatures. Such lenses can accommodate the elevated temperature levels associated with incandescent light sources, for example for use with automotive headlamps, and other high-temperature light sources.

Besides such rotationally symmetric lenses, the present embodiments can be configured with some small departures from such symmetry. This allows the profile to undergo modest changes during the rotational sweep, and allows the accommodation of asymmetric illumination prescriptions, such as those for automotive headlamps. Typically, the more collimated the input, the more pronounced such asymmetries can be, and the greater can be the control of stray light.

As discussed above, some lenses configured according to the present embodiments are combined and/or cooperated to achieve a desired resulting output. For example, a plurality of lenses can be cooperated to provide a vehicle headlamp with a desired intensity prescription.

In one configuration the present embodiments includes a lens structure with four quadrants, each having somewhat different generative profiles, but molded as a single lens. In one configuration the present embodiments include a biform concentrator with rotationally variable profile that is right-left symmetric.

While the invention herein disclosed has been described by means of specific embodiments and applications thereof, numerous modifications and variations could be made thereto by those skilled in the art without departing from the scope of the invention set forth in the claims.

What is claimed is:

1. A method for use in defining a lens profile, comprising:
    determining an illumination integral for an illuminance pattern of an input beam;
    determining a far-field intensity prescription;
    establishing a one to one spatio-angular correspondence of transverse location of the input beam with direction in the intensity prescription;
    deriving surface normal vectors of an output surface of the transverse locations across the input beam; and
    determining the output surface according to the surface normal vectors.

2. The method of claim 1, further comprising:
    determining a normalized cumulative illumination integral for the far-field intensity prescription.

3. The method of claim 2, wherein the determining the illumination integral further comprises determining a normalized illumination integral for the transverse illuminance pattern.

4. The method of claim 3, further comprising:
    determining modifications for the output surface; and
    applying modifications to the output surface to attain the intensity prescription.

5. The method of claim 1, further comprising:
collimating the input beam generating a collimated input beam; and
the determining the illumination integral for the illuminance pattern of the input beam comprises determining the illumination integral for the illuminance pattern of the collimated input beam.

6. The method of claim 5, wherein the determining the output surface according to the surface normal vectors comprises determining the output surface so that the intensity prescription is a rectangular pattern.

7. The method of claim 1, wherein the establishing a one to one spatio-angular correspondence comprises assigning a unique far-field divergence angle to a plurality of spatially related radiuses within the input beam.

8. A method for use in defining a lens profile, comprising:
determining an intensity prescription;
determining an illuminance pattern of an input beam; and
defining an optically active surface of a lens, comprising:
  integrating a cumulative flux distribution of the determined illuminance pattern;
  integrating a cumulative flux distribution of the determined intensity prescription and obtaining first and second factored profile angles;
  sweeping the first profile angle along a space defined by the second profile; and
  defining the optically active surface according to the sweep of the first profile angle.

9. The method of claim 8, further comprising:
modifying the determined optically active surface at perimeters of the determined active surface.

10. The method of claim 9, further comprising:
determining a subsequent intensity prescription according to the defined optically active surface;
repeating the defining of the optically active surface of the lens; and
determining a subsequent optically active surface according to the subsequent intensity prescription.

11. The method of claim 8, wherein the integrating the cumulative flux distribution of the determined illuminance pattern comprises calculating a one dimensional integration for a first axis and calculating a one dimensional integration for a second axis; and
wherein the integrating the cumulative flux distribution of the determined intensity prescription comprises calculating a one dimensional integration for the first profile angle and calculating a one dimensional integration for the second profile angle.

12. The method of claim 11, wherein the integration of the first axis and the integration of the second axis are made equal to a cross-section of the input beam, where the input beam is circularly symmetric.

* * * * *